UNITED STATES PATENT OFFICE.

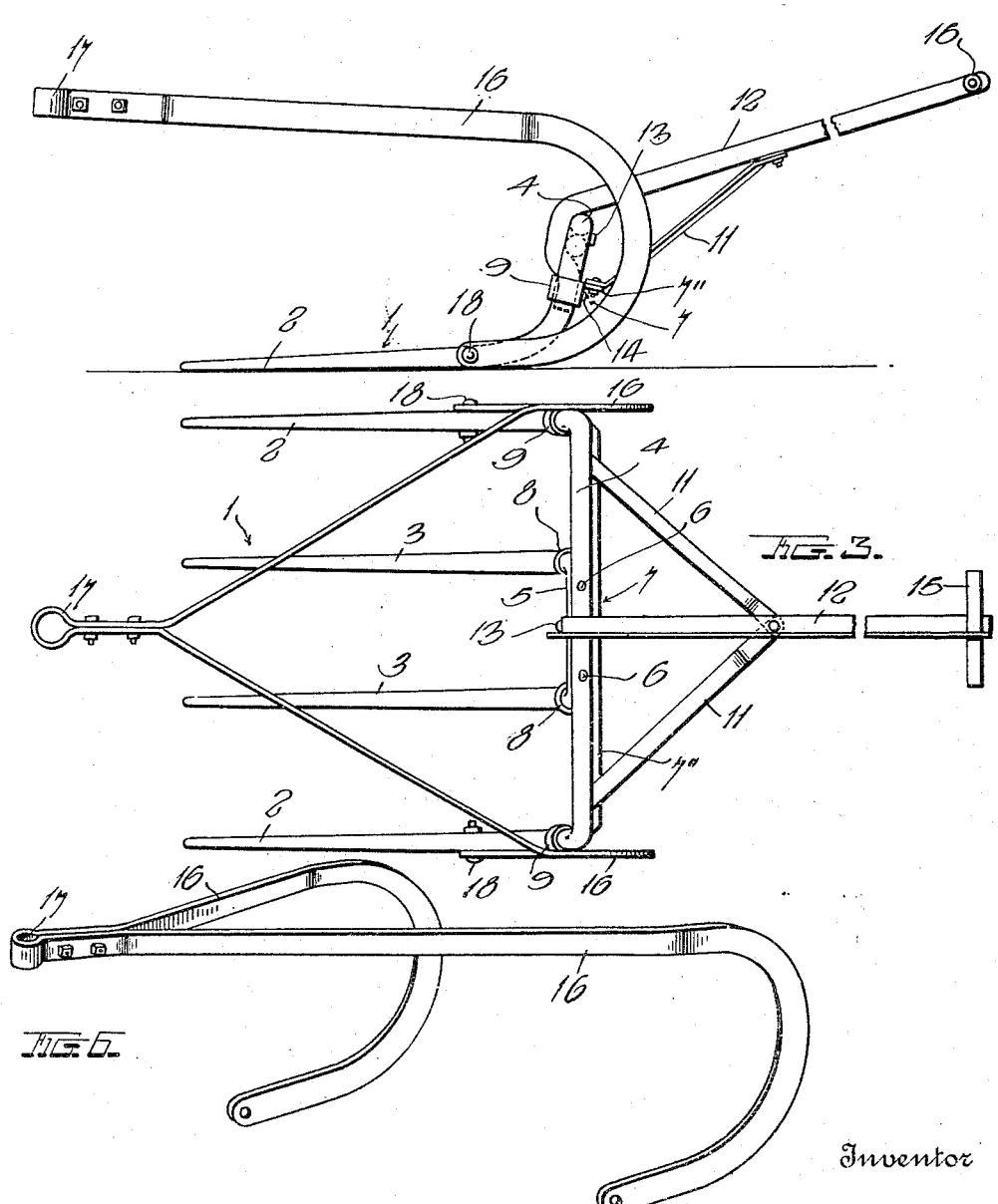

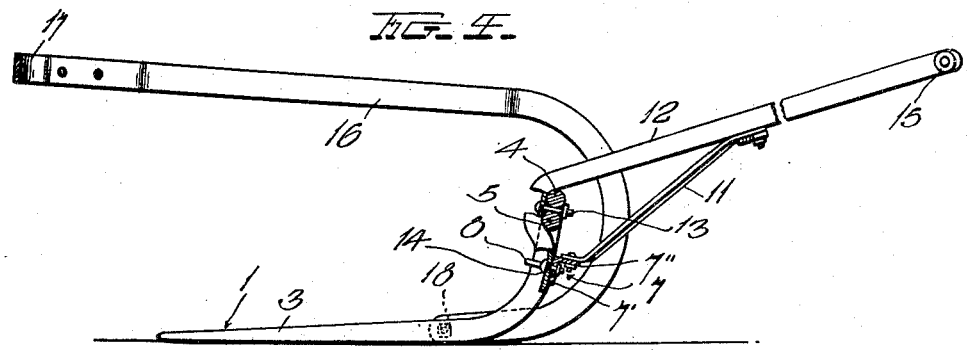
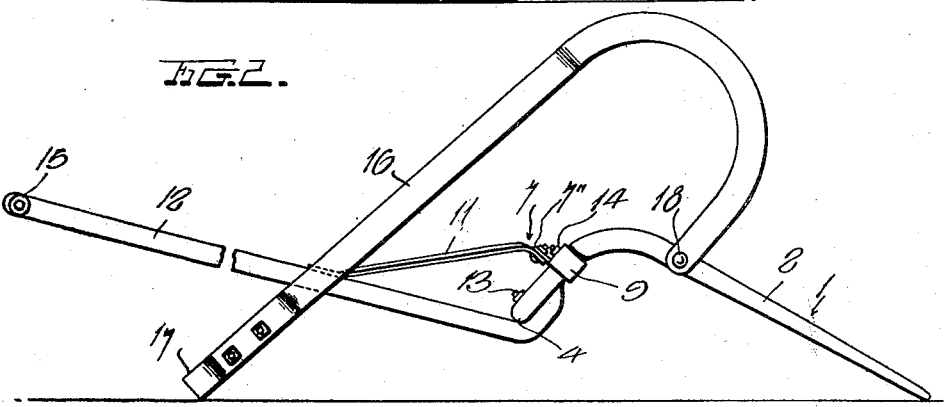
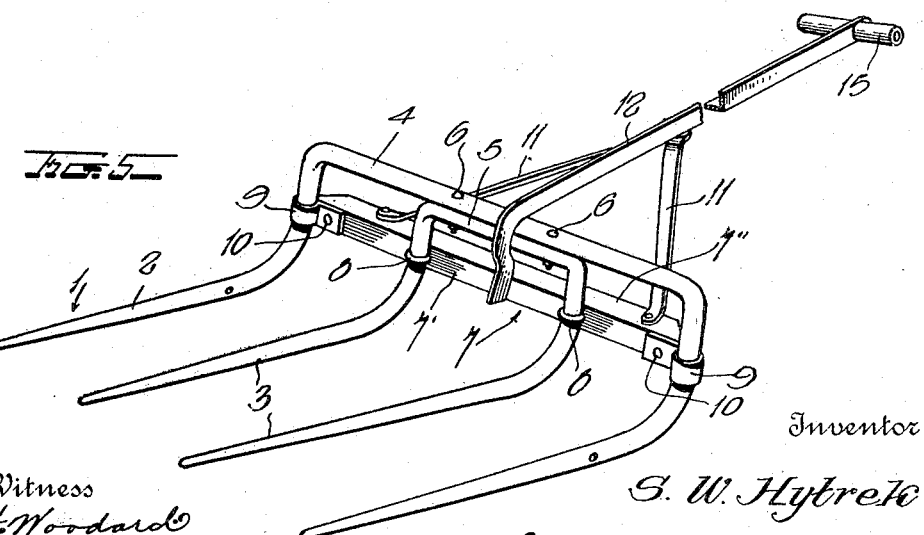

STANISLAUS W. HYTREK, OF STUART, NEBRASKA.

SCRAPER.

1,206,709.     Specification of Letters Patent.     Patented Nov. 28, 1916.

Application filed May 25, 1916. Serial No. 99,863.

*To all whom it may concern:*

Be it known that I, STANISLAUS W. HYTREK, a citizen of the United States, residing at Stuart, in the county of Holt and State of Nebraska, have invented certain new and useful Improvements in Scrapers; and I do declare the following to be a full, clear, and exact description of the invention, such as will enable others skilled in the art to which it appertains to make and use the same.

My invention relates to improvements in scrapers of the class adapted to collect litter and the like from the earth to carry it from place to place, the device being adapted primarily for carrying manure from a low pile to a loader or for collecting such material from the earth and conveying it to said loader.

The object of the invention is to provide a device of the class specified which may be easily and inexpensively manufactured and marketed yet which regardless of these advantages will be highly efficient and durable.

With this general object in view, the invention resides in certain novel features of construction and unique combinations of parts to be hereinafter fully described and claimed, the descriptive matter being supplemented by the accompanying drawings which constitute a part of this application and in which:

Figure 1 is a side elevation of the device in position for gathering the material; Fig. 2 is a similar view showing the manner in which the scoop discharges its load; Fig. 3 is a top plan view; Fig. 4 is substantially a central longitudinal sectional view; Fig. 5 is a perspective view of the gathering and carrying fork; and Fig. 6 is a similar view of the drawbars.

In specifically describing the construction shown in the drawings above briefly described, similar characters will be placed on corresponding parts throughout the several views and reference will be herein made to numerous elements by their respective indices. To this end, the numeral 1 designates the gathering and carrying fork of the improved scraper, said fork including outer and inner tines 2 and 3 respectively. The outer tines 2 are formed by bending the opposite ends of a horizontal bar 4 downwardly and extending them forwardly while the tines 3 are similarly constructed of the ends of a bar 5. The straight portion of bar 5 underlies the center of the bar 4 and is secured thereto by bolts or the like 6.

An angle iron bar 7 extends horizontally of the fork 1 in rear of the vertically disposed portions of the tines 2 and 3, the upright flange 7' of said bar being disposed in contact with said portions while the horizontal flange 7'' thereof extends rearwardly. The flange 7' is secured to the tines 3 by U-bolts 8 passing around the latter and through said flange while the ends of the latter are bent around the tines 2 as shown at 9 and secured by bolts or the like 10. The bar 7 serves to hold the numerous tines in rigid spaced relation and at the same time serves as anchoring means for the lower ends of a pair of downwardly and forwardly diverging braces 11 whose upper ends are secured to a longitudinally disposed angle metal handle 12 which extends rearwardly from the fork. The front end of said handle may be secured in any preferred manner to the fork, but the front end of said handle is preferably bent downwardly in front of the bars 4 and 5 and secured by bolts 13 and 14. The former passes between the bars 4 and 5 and the other through the flange 7' of bar 7. The rear end of the handle 12 is preferably provided with a transverse bar 15 to be grasped by the operator.

The rear ends of a pair of J-shaped drawbars 16 are pivoted to the tines 2 near the rear ends of the latter, said bars converging forwardly and being joined by a loop 17 which, in the present embodiment of the invention, is formed of the same metal bar of which the drawbars 16 are constructed. One or more horses or other draft animals may be hitched to the device by the application of a suitable clevis or the like through the loop 17 and the entire scraper may thus be drawn forwardly. When the fork 1 stands as shown in Figs. 1, 4 and 5 it will collect material from the earth or from a low pile over which it is being pulled and when it has been sufficiently loaded, depression of the handle 12 will prevent the depositing of other material thereon. The device may then be drawn to any desired point whereupon the handle will be raised. The result of this is that the pointed front ends of the tines 2 and 3 will bite into the earth and will thus invert the device as shown in Fig. 2, thereby discharging its load.

From the foregoing, taken in connection with the accompanying drawings, the construction and manner of operation of the improved scraper will be readily understood but it may be explained that by pivoting the drawbars 16 to the fork 1 at the points 18, the forward pull exerted on said drawbars will have little or no tendency to invert the fork until the handle 12 is raised sufficiently to cause the tines to catch in the earth. The device is thus much more advantageous than it would be were the pivots disposed at higher points.

In the foregoing I have described certain specific details of construction for accomplishing probably the best results, and in the accompanying drawings such details have been shown. It is to be understood, however, that within the scope of the invention as claimed numerous changes may be made without sacrificing the main advantages thereof.

I claim:

1. A scraper comprising a pair of horizontal bars secured in contact, the ends of both bars being bent downwardly and forwardly to provide a plurality of fork tines having upwardly directed rear ends, a horizontal reinforcing bar secured rigidly to said rear ends of the tines, a handle secured to the contacting portions of said pair of bars and extending rearwardly therefrom, braces for said handle secured thereto at one end and to said reinforcing bar at their other end, and a pair of drawbars pivoted to the outermost tines.

2. A scraper comprising a pair of horizontal bars secured in contact at their intermediate portions, the ends of said bars being bent downwardly and extended forwardly to provide parallel fork tines having upwardly directed rear ends, an angle metal bar parallel with the intermediate portions of the other bars and contacting with the upwardly directed rear ends of the fork tines, U-bolts passing around the innermost of said tines and through the upright flange of said angle metal bar, the ends of the latter being bent around the upwardly directed ends of the outermost tines, a handle secured at its front end to the contacting portions of said pair of bars, inclined braces secured at their front ends to the horizontal flange of said angle metal bar and at their rear ends to said handle, and a pair of drawbars pivoted to the outermost tines.

In testimony whereof I have hereunto set my hand in presence of two subscribing witnesses.

STANISLAUS W. HYTREK.

Witnesses:
 WM. KROTTER,
 WALTER CROWLEY.

Copies of this patent may be obtained for five cents each, by addressing the "Commissioner of Patents, Washington, D C."